Patented Apr. 21, 1953

2,636,029

UNITED STATES PATENT OFFICE 2,636,029

SULFUR CONTAINING ORGANIC COMPOSITION AND PROCESS OF MAKING SAME

Herman S. Bloch, Chicago, Ill., assignor to Universal Oil Products Company, Chicago, Ill., a corporation of Delaware No Drawing. Application December 31, 1948, Serial No. 68,754

16 Claims. (Cl. 260—139)

1

This application is a continuation-in-part of my copending application Serial Number 546,429, filed July 24, 1944, now abandoned.

This invention relates to a new composition suitable for use in rubber compounding and in the preparation of various rubber and rubber-like materials. More specifically, the invention is directed to the preparation of factices ranging in physical properties from heavy viscous oils to hard, brittle, solids formed by reacting sulfur with a polyolefinic hydrocarbon oil and/or a mixture or cobodied composition of said hydrocarbon oil with an unsaturated fatty acid glyceride oil.

It has been known that factices having rubberlike or plastic properties may be prepared by vulcanizing certain unsaturated vegetable oils with sulfur or with sulfur chloride. It is also known in the art that factice-like products are formed in the reaction of mono-olefinic hydrocarbons with sulfur and sulfur monochloride, and in these preparations, the products have been of relatively low molecular weight because of the limited number of olefinic double bonds available for condensation with the sulfur-containing reactant and the initial relatively low molecular weight of the olefinic hydrocarbon. In accordance with the process of this invention, it has been found that a new and improved product having relatively high molecular weight and multiple carbon-sulfur linkages which may be applied in a wide variety of uses is formed by reacting sulfur with a synthetic hydrocarbon oil alone, or in admixture or co-bodied with an unsaturated fatty acid glyceride oil. The unique properties of the present product are believed to depend upon the unusual system of conjugated as well as non-conjugated olefinic double bonds in the molecular structure of the hydrocarbon charging stock and the cyclic configuration of the hydrocarbons. The present product differs from the factices of the prior art, therefore, because of substantial distinctions in the charging stock, providing inherent differentiation in the respective products.

It is another object of my invention to prepare a factice having properties which peculiarly adapt the product to its use in the compounding of rubbers and to the manufacture of a variety of articles of commerce.

The primary object of the present invention, therefore, is to provide a process for the manufacture of a new composition suitable for use as a factice.

In accordance with one of its embodiments, the present invention relates to a process for the preparation of a factice which comprises reacting a drying oil comprising polyolefinic, cyclic compounds containing conjugated as well as non-conjugated unsaturation with sulfur at reaction conditions sufficient to effect molecular combination of said reactants.

2

Another embodiment of the invention relates to the preparation of a factice by reacting sulfur with a cobodied drying oil composition comprising a co-polymerized mixture of polyolefinic, cyclic hydrocarbons containing conjugated as well as non-conjugated unsaturation recovered from a sludge formed in a conjunct polymerization reaction and an unsaturated fatty acid glyceride.

Other embodiments of the present invention relating to specific drying oil reactants, the process variables involved in the preparation of the present factice product and to specific procedures for effecting the condensation reaction will be referred to in greater detail in the following further description of the invention.

The primary starting material involved in the production of the present factice composition is referred to herein as a drying oil containing reactive compounds having a polyolefinic, cyclic structure. One species of the drying oil reactant utilizable in the process is characterized as "unsaturated conjunct polymers" comprising a mixture of polyolefinic, cyclic hydrocarbons in which the olefinic double bonds in the molecular structure of the compounds are in conjugated as well as non-conjugated relationship to each other. These hydrocarbons are prepared by synthesis from lower molecular weight unsaturated monomers in the presence of an acid-acting type catalyst, the resulting product, hereinafter more specifically described, being designated as a "conjunct polymer" and the reaction mechanism involved in the synthesis being denominated a "conjunct polymerization reaction." Another species of the drying oil reactant utilizable in the present process is represented as a cobodied or copolymerized mixture of the unsaturated hydrocarbon conjunct polymers and an unsaturated fatty acid ester drying oil. These copolymers contain residual olefinic unsaturation by virtue of the large number of excess olefinic double bonds in the unsaturated conjunct polymers other than the unsaturated bonds required in or involved in the cobodying reaction. The remaining so-called "residual" unsaturation, which may comprise as many as two or three isolated and/or conjugated olefinic linkages is capable of combining with one or more sulfur atoms to form the present factice composition. The high molecular weight of the resulting condensation product which may contain one or more sulfur atoms, or unreacted olefinic double bonds provides a product having especially desirable properties as an additive to rubber compositions, etc. Thus, by means of the present process and by controlling the amount of sulfur added to the drying oil in the compositing stage of the present process, the total number of sulfur atoms in the factice product may be determined accurately. Furthermore, the unsaturation of the product may also be controlled similarly by the amount of sulfur introduced into the compositing reaction mixture with the drying oil reactant. Through this degree of control over the molecular composition and structure of the final product, a rather wide variety in the physical properties of the factice may be obtained. The products of the present process are therefore distinguishable from the factices of the prior art on the basis of the large number of olefinic double bonds in the charging stock to the compositing reaction with sulfur, yielding a product having either a large number of sulfur-carbon atom linkages (when the molar ratio of sulfur to drying oil charged to the compositing reaction is large) or a small number of sulfur-carbon linkages and a relatively large number of residual olefinic linkages (when said molar ratio of sulfur to drying oil is small).

The mixture of cyclic, polyolefinic hydrocarbons or unsaturated conjunct polymers involved in the present condensation reaction with sulfur to form the factice herein referred to are formed by means of a process known in the art as a conjunct polymerization type of reaction. In the latter reaction, certain types of hydrocarbons having a particular structure generally specified as a monomer, preferably having an unsaturated, non-aromatic structure when contacted with certain inorganic catalysts of the acid-acting type, at selected reaction conditions, undergo a special type of reaction, the so-called "conjunct polymerization reaction" or series of reactions, to form a sludge-type product containing loosely bound complex addition compounds of the catalyst and said unsaturated conjunct hydrocarbon polymers. The latter mixture of hydrocarbons may be recovered, free of the catalyst, from the sludge by special methods of decomposition. On the basis of physical and chemical analyses thereof, the mixture of conjunct polymer hydrocarbons formed in the conjunct polymerization of open-chain olefines is found to comprise highly unsaturated hydrocarbons containing compounds of high molecular weight and of generally cyclic, non-aromatic structure in which the unsaturation is both of the conjugated and non-conjugated variety. The cyclic structure, furthermore, comprises almost wholly five membered rings, as hereinafter more specifically described.

The properties of the ultimately recovered mixture of conjunct polymers depends to some extent upon the type of hydrocarbons employed in the sludge-forming or conjunct polymerization reaction. Suitable hydrocarbon starting materials for the preparation of the sludge comprise, in general, the unsaturated hydrocarbons containing at least three carbon atoms per molecule, such as the monoolefins, polyolefins, and/or acetylenic hydrocarbons of either branched or straight chain structure, although branched chain hydrocarbons are believed to produce the sludge more readily and usually in greater yields. Cyclic olefins and isoparaffins, containing at least three carbon atoms per molecule may also be employed as charging stock, either individually or in admixture with, for example, mono or polyolefins. A mixture of the various classes of hydrocarbons specified above may also be charged to the reaction, the proportion of aromatic hydrocarbons in the mixture desirably being small or preferably nil, since the latter hydrocarbons tend to reduce the yield of sludge. An especially preferred charging stock from the standpoint of general availability and desirability in producing a sludge in high yields is an octene fraction of a selective or non-selective polymer gasoline (prepared by the copolymerization of various butylenes and/or propylenes) or the hexene-nonylene fraction of a propylene polymer. Other suitable hydrocarbon charging stocks for the preparation of the present conjunct polymers are the various fractions of thermally cracked gasoline which have been treated to reduce the content of aromatic hydrocarbons normally present in thermally cracked gasoline.

The organic conjunct polymerization catalysts which, when contacted with the hydrocarbon charging stock having the above enumerated properties, yield a sludge containing complex addition products of the catalyst with the conjunct polymers formed in the reaction are generally characterized as acid-acting polymerization catalysts and are generall substantially anhydrous. The catalysts utilizable in the present process include certain members of the anhydrous Friedel-Crafts metal halide group and certain inorganic acids. Thus, anhydrous aluminum chloride and aluminum bromide, are capable of effecting conjunct polymerization of the unsaturated hydrocarbon charging stock. Of the inorganic mineral acids utilizable as catalysts, sulfuric acid of a concentration usually above about 85%, and preferably from about 95 to about 100% concentration and hydrofluoric acid containing at least 90% hydrogen fluoride (preferably the substantially anhydrous reagent) comprise another group of the generally broad class of acid-acting catalysts utilizable to effect conjunct polymerization.

On contacting the hydrocarbon charging stock and acid-acting catalyst at reaction conditions specified, generally, as "sludge-forming" or "conjunct polymerization" reaction conditions, the catalyst promotes polymerization, cyclization and hydrogen transfer reactions of the components of the reaction mixture to form products of two types: relatively saturated hydro-polymer, and high molecular weight cyclic polyolefin hydrocarbon compounds which combine with the catalyst in definite molecular proportions to form a catalyst-polyolefinic hydrocarbon addition complex comprising the sludge. The latter is a fluid, somewhat viscous product of the reaction containing definite chemical compounds of the coordinated complex type. The net result of the combined hydrogen transfer, polymerization and cyclization reactions (which, in effect, occur substantially as a simultaneous combination reaction referred to in the aggregate as a conjunct polymerization reaction) is the production of the polyolefinic cyclic hydrocarbons in combination with the catalyst as a sludge.

The sludge-forming reaction is effected by contacting the hydrocarbon starting material of the aforementioned composition, preferably an olefinic charging stock composed of olefins having at least 3 carbon atoms per molecule with the conjunct polymerization catalyst at a temperature within the range of from about 0° to about 200° C., preferably from about 30 to about 125° C. and at a superatmospheric pressure sufficient to maintain the reactants in substantially liquid phase. The reaction conditions required in the formation of a sludge for each of the conjunct polymerization catalysts hereinabove specified may vary, depending upon the activity of the catalyst. For example, temperatures in the lower range of the above temperature range are utilized when sulfuric acid is employed as catalyst, because of the oxidizing tendency of sulfuric acid at temperatures above about 150° C., the preferred reaction temperature for the use of sulfuric acid being within the range of from about 20° to about 125° C. Observation has shown that substantially anhydrous hydrofluoric acid having a concentration greater than about 95% is the preferred conjunct polymerization catalyst, not only on the basis of superior yields and quality of the hydrocarbon product recovered from the sludge, but also from the standpoint of certain operating advantages, especially in the sludge decomposition stage where thermal methods of decomposition may be employed, making it possible to recover, for recycling, a hydrogen fluoride effluent phase containing from 98 to about 100% anhydrous hydrogen fluoride. An optimum yield of sludge is obtained, when the weight ratio of olefins to the hydrogen fluoride catalyst charged to the sludge-forming reaction zone is maintained from about 1.5 to about 3.5, preferably from about 1.7 to about 2.5. The pressure within the reaction vessel is maintained sufficiently superatmospheric (generally up to about 100 atmospheres) to provide liquid phase conditions in the reactor. With the other catalysts mentioned, corresponding ratios of catalyst to hydrocarbon reactant are preferred.

At the above reaction conditions and when the reaction mixture of hydrocarbons and catalyst is mixed by some form of stirring device, sludge formation takes place within a few minutes, although the reaction may be allowed to continue for one or more hours to obtain peak production of the sludge. The liquid sludge phase and an upper layer saturated hydrocarbon phase formed as products of the conjunct polymerization reaction separate on standing, and the separate phases may be recovered by decanting one from the other.

The conjunct polymers or polyolefinic, cyclic hydrocarbon drying oil mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated product but reduces the concentration of the recovered catalyst phase to the point that it cannot be economically recovered for recycling purposes to the sludge-forming stage. This method which consists in hydrolyzing the sludge in an aqueous medium is effected by thoroughly mixing the sludge with water or a dilute alkali solution. During the hydrolysis, the unsaturated conjunct polymer hydrocarbons associated with the catalyst in the sludge form a separate phase and rise to the top of the mixture, while the water-soluble catalyst enters the aqueous phase. In the case of the aluminum halides, the aqueous hydrolysis procedure hydrolyzes the catalyst chemically so that even by evaporation of the water, the original anhydrous aluminum halide cannot be recovered as such. In the case of sulfuric acid and hydrogen fluoride, the water merely hydrolyzes the catalyst-conjunct polymer complex and the anhydrous catalyst may be recovered from the aqueous phase by removing the water therefrom. Attending the high cost of the recovery procedure for reconcentrating the acid, these methods require the use of acid-resistant equipment, not only in the aqueous hydrolysis step but also in the distillation equipment for concentrating the aqueous acid.

The necessity of recovering the conjunct polymerization catalyst in a nearly anhydrous state by means of an inexpensive procedure constitutes one of the chief advantages in the use of hydrogen fluoride as catalyst since hydrogen fluoride may be vaporized from the sludge, cooled and reliquefied for recycling purposes. The decomposition of the sludge may thus be effected by merely heating the sludge until the hydrogen fluoride component thereof is removed by vaporization, leaving a hydrocarbonaceous residue in which the component hydrocarbons contain more or less conjugated unsaturation, depending upon the conditions involved. The latter thermal decomposition method, however, as may be expected from the known polymerization activity of free anhydrous hydrogen fluoride, yields an inferior hydrocarbon product containing few if any, conjugated olefinic bonds desired in the production of the present factice composition. The thermal decomposition method, however, may be modified to provide a method in which many of the disadvantages associated with the simple thermal decomposition are obviated. Such modified procedures involve decomposing the sludge in the presence of a sludge decomposition catalyst or in the presence of an inert diluent which dissolves the liberated sludge hydrocarbons immediately upon decomposition and removes them from contact with the free hydrogen fluoride. In the catalytic decomposition method, the hydrogen fluoride sludge, at a temperature of from about 50° to about 250° C., is charged into a reactor column packed with a catalytic material which enhances the decomposition of the sludge but retards the cracking and polymerization of the conjunct polymers released from the sludge. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, graphitic carbon and metallic fluoride or oxyfluoride salts. Among the preferred catalysts for effecting the decomposition, lead, copper and cobalt as well as certain brasses containing copper, lead and tin have been found to be some of the most effective in obtaining decomposition of the sludge and recovery of the hydrocarbon product in which the components contain a maximum of conjugated and non-conjugated unsaturation.

In the thermal decomposition method involving decomposition of the hydrogen fluoride sludge by charging the same into a liquid pool of inert diluent, the temperature of the diluent is maintained sufficiently high that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product that very little of the latter hydrocarbons are flashed into the hydrogen fluoride vapor outlet. Suitable inert liquids into which the hydrogen fluoride sludge is charged may be a hydrocarbon such as a paraffin or a naphtha boiling from about 50° to about 180° C., preferably from about 110° to about 140° C. Such hydrocarbons include the octanes, monanes, decanes, or a mixture thereof, such as a fraction of the straight run gasoline boiling in the above range, or a naphtha such as diethylcyclohexane, trimethylcyclohexane, etc. Other inter diluents include the haloalkanes such as bromo- or chloroheptane and various inorganic compounds such as salts melting below the above desired temperature range of operation and which are chemically stable to hydrogen fluoride. The heat of vaporization of the hydrogen fluoride and the heat of decomposition may be supplied in the decomposition zone by maintaining the inert diluent under reflux and allowing the hydrogen fluoride sludge to come into direct contact with the hot vapors from the reboiling section.

The mixture of hydrocarbons comprising the product of the conjunct polymerization reaction containing hydrocarbons having conjugated and non-conjugated unsaturation recovered from the conjunct polymerization sludge is a series of high molecular weight, cyclic compounds of wide boiling range but of generally homologous structure, the cyclic portion of the hydrocarbons having a cyclopentenyl structure in which the olefin bond of the cyclopentene ring is in conjugation with an olefinic bond present in an alkenyl or alkapolyenyl side chain. Infra-red and ultraviolet absorption studies, as well as other analytical data, determined on the recovered conjunct polymers have indicated that the individual hydrocarbons are cyclic, although substantially non-aromatic, have isolated unsaturation in addition to conjugated unsaturation, and that the four carbon atoms which constitute the conjugated system are highly substituted, possessing, on the average, fewer than two hydrogen atoms as substituents. Typical hydrocarbons present in the mixture of unsaturated conjunct polymers appear to have the following structure:

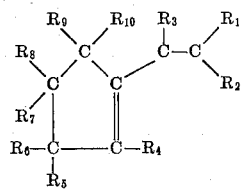

in which $R_1$—$R_{10}$ are hydrogen or hydrocarbon radicals selected from the group consisting of alkyl, alkenyl, and alkapolyenyl radicals, and at least 2 of the groups $R_4$—$R_{10}$ are hydrocarbon radicals and not more than 2 of the groups $R_1$—$R_4$ are hydrogen. The hydrocarbons boil from about 150 to over 450° C., have bromine numbers above about 140, maleic anhydride values of from about 30 to about 90, an average number of olefinic double bonds per molecule from about 2.5 to about 4, of which from about 40 to about 70% are conjugated and average molecular weights of from about 250 to about 400, although some components may have molecular weights as high as about 1000. It is preferred, in the preparation of the present factice composition to utilize the relatively low-boiling ends of the mixture of conjunct polymers recovered from the sludge, as these are usually of lighter color and ultimately produce products of lighter color than the higher boiling fractions of the conjunct polymer mixture. For this purpose, fractions boiling up to about 350° C. are preferred.

The drying oil component of the present factice composition may also comprise a cobodied mixture of an unsaturated fatty acid ester and the unsaturated conjunct polymers hereinabove described which are cobodied prior to admixing the same with the sulfur reactant of the present process. In order to effect the cobodying reaction between the unsaturated hydrocarbon and fatty acid ester drying oils, the latter are intimately mixed and heated to a temperature of from about 250° to about 350° C. for a period of time generally from about 1 hour to about 6 hours or until the viscosity approaches the desired value. The cobodying reaction may also be effected in the presence of certain types of catalysts, generally characterized as acid-acting reagents such as phosphoric acid, the acidic silica-alumina composites, or the solid phosphoric acid catalyst known to the art, formed by calcining a siliceous absorbent such as kieselguhr impregnated with a suitable phosphoric acid such as orthophosphoric acid. The resulting cobodied oil comprises a mixture of the copolymers of the unsaturated conjunct polymer hydrocarbon drying oil with the unsaturated fatty acid glyceride which contains several olefinic double bonds, some of which may be conjugated, and is usually of higher viscosity than either of the original drying oil starting materials. The cobodying procedure may also be accompanied by seam- or air-blowing to provide a typical "blown" oil. Suitable unsaturated fatty acid ester drying oils when cobodied with the unsaturated conjunct polymers to form one species of the drying oil reactant herein provided are those which occur either naturally as fatty acid glycerides or the synthetic modified fatty acid esters in which the glyceride ester linkage is replaced by esters of other types of alcohols such as ethanol, a glycol, a polymeric glycol such as a member of the polyethylene glycols, a polyhydric alcohol such as pentaetrythritol or 2, 2 dimethylolpropanol, or an unsaturated alcohol such as butenol. Included among the unsaturated fatty acid ester drying oils contemplated herein are the drying and semi-drying classes such as those glycerides in which the fatty acid portion of the ester contains conjugated and/or non-conjugated olefinic double bonds respectively. Of these, tung oil, linseed oil, dehydrated castor oil, oiticica oil, perilla oil, soybean oil, hemp-seed oil, poppy-seed oil, safflower oil, walnut oil, etc., are representative oils of the glyceride ester type utilizable herein. Other glyceride oils which are considered to be non-drying, such as olive oil, cottonseed oil, and coconut oil, may be utilized in admixture wtih the unsaturated conjunct polymers to form a factice composition.

The present compositions are prepared by reacting sulfur with a mixture of unsaturated conjunct polymers or a mixture of the same with one or more unsaturated fatty acid esters, preferably cobodied therewith prior to the factice preparation, at a temperature of from about 125° to about 275° C. and at a pressure sufficient to maintain liquid phase conditions and for a time sufficient to produce a product having the desired viscosity and other properties suitable for the use intended of the factice. The reaction may be enhanced or catalyzed (for example, when the reaction temperature is desirably maintained at a minimum to prevent discoloration of the product and/or to control the reaction rate) by the addition of small amounts (up to about 5% of the reaction mixture) of such compounds as phosphorous pentasulfide, sulfur mono-chloride and similar catalysts. The proportion of reactants may be varied considerably, depending upon whether a factice of high organically bound sulfur content is desired, or alternatively, a factice containing a high content of residual olefinic unsaturation. In general, the weight ratio of sulfur to drying oil reactants is maintained at from about 0.05 to about 1, and preferably from about 0.1 to about 0.4. A viscous liquid or rubbery product is obtained when utilizing low molar ratios of sulfur in the reaction, whereas tougher, harder and generally light-colored products are produced when the proportion of sulfur in the reaction mixture is increased. Rubbery and tough semi-solid factices are produced by the reaction of a co-bodied unsaturated fatty acid ester and the unsaturated conjunct polymers, while products which range from liquid and soft rubbery masses to brittle dark solids lacking in toughness, are formed in the reaction of sulfur with the unsaturated conjunct polymers, and products of intermediate properties are produced from sulfur and simple mixtures of the glyceride oils with the conjunct polymer oils. By careful selection of the reactants and proportions of reactants employed, it is thus feasible to manufacture a material having specific properties and suitable for a wide variety of uses. Besides being valuable in the preparation of numerous commercial products such as floor coverings, leather substitues, roofing, binding agents, adhesives, sealing compounds, etc., the composition of my invention also has certain desirable properties which are useful in the compounding of rubbers. For example, the factice enhances the working properties of rubber compositions, aids in extrusion, aids in maintaining form during the curing process, is useful for incorporating large amounts of sulfur in rubber compositions, etc.

Various organic or inorganic fillers and/or pigments may also be incorporated into the factices. These fillers include such materials as wood flour, or fiber, asbestos, whiting, etc. The fillers are selected according to the properties desired for the uses to which the final product is to be put. The fillers may be added to the factice composition during the heating step or the modifying materials may be milled into a partially or wholly vulcanized product.

The process of the present invention is further illustrated in the following examples wherein the character of the charging stock, the method of preparing specific factice compositions and other embodiments of the invention are more specifically described. The examples are not to be interpreted as limiting the scope of the invention in any of its broad aspects, nor necessarily in accordance with the values hereinafter specified.

Example I

A mixture of polyolefinic, cyclic hydrocarbons or conjunct polymers in which the olefinic unsaturation is both conjugated and unconjugated and is prepared by means of the following conversion: An octene fraction of a co-polymer gasoline (the product of the mixed polymerization of propylene and butylene monomers) is reacted with hydrogen fluoride to form a sludge phase and a relatively saturated upper hydrocarbon phase. In this reaction, 22 liters (16.5 kg.) of the gasoline (having a bromine number of 162 and containing mono-olefinic hydrocarbons varying in molecular weight from octene to dodecylene) is charged into a pressure autoclave and rapidly stirred as 9.0 kg. of liquid anhydrous hydrogen fluoride is introduced into the reactor. The pressure is maintained at approximately 205 lbs./sq. in. and the temperature at about 91° C., as stirring is continued for a reaction period of approximately one hour. The upper saturated hydrocarbon phase is decanted from the lower acidic sludge layer and the latter sludge treated in accordance with the following method of decomposing the hydrogen fluoride sludge complexes contained therein.

5000 grams of the above sludge is allowed to flow into a mixture of ice and water, additional ice being added as the heat of the resulting hydrolyzing reaction melts the ice. 2170 grams of a light-colored, sweet-smelling oil separates from the aqueous phase, which has the following physical and chemical properties:

Boiling range_____ 160° to about 400° C.
Density, $D_4^{20}$_____ 0.863
Molecular weight average _____ 304
Diene number_____ 85
Bromine number_____ 195
Double bonds per molecule average_____ 3.2

Ten parts by weight of a fraction boiling from about 220° to about 320° C. was separated from the mixture of unsaturated conjunct polymers recovered by hydrolysis from the hydrogen fluoride sludge as described above and was heated with 4 parts by weight of sulfur at a temperature of 240° to 250° C. in a pressure autoclave in an atmosphere of about 70 p. s. i. of nitrogen. Upon cooling the reaction mixture, it solidified into a hard, brittle solid.

Example II

A mixture of equal parts by weight of the unsaturated conjunct polymers prepared as in Example 1 and linseed oil was cobodied by heating the mixture at 200° C. until the product had a viscosity of 38 poises. Ten parts by weight of the cobodied oil and four parts by weight of sulfur were heated at 240° C. for 30 minutes at a super-atmospheric pressure. The cooled product was a light, tough rubbery material.

Example III

A mixture of 60 volume percent soybean oil and 40 volume percent of the unsaturated conjunct polymers of Example I was cobodied at 300° C. to a viscosity of 9 poises. Twenty parts by weight of the cobodied mixture and 8 parts by weight of sulfur were heated at 240° C. to form a tough, grey-brown rubbery factice upon cooling.

Example IV

Twenty parts by weight of the unsaturated conjunct polymers prepared in Example I was heated with 2 parts by weight of sulfur at 160° C. for 30 minutes. The product was a viscous fluid factice.

Example V

A mixture of 6 parts by weight of linseed oil and 4 parts by weight of the unsaturated conjunct polymers formed as in Example I was cobodied at 300° C. to a viscosity of 38 poises at a superatmospheric pressure. The resulting cobodied oil was admixed with 10% of its weight of sulfur and heated at 240° C. until homogeneous. The product upon cooling was a dark rubbery solid.

Example VI

A mixture of 40% by volume of the full-boiling range mixture of unsaturated conjunct polymers prepared as in Example I and 60% of linseed oil was heated with 40% by weight of sulfur to a temperature of 240° C. The mixture became homogeneous at this temperature and when cooled, it set to a tough rubbery product.

Example VII

A mixture of 60 volume percent of soybean oil and 40 volume percent of unsaturated conjunct polymers prepared as in Example I was heated at 240° with 20 weight percent of sulfur until the mixture became homogeneous. The resulting factice was a rubbery solid, light in color.

Example VIII

The factice product formed by the reaction of sulfur with an unsaturated glyceride oil only, in the absence of the unsaturated conjunct polymers is a dark, tacky liquid as shown in the following experiment.

A mixture of twenty parts by weight of soybean oil and 8 parts by weight of sulfur was heated to a temperature of 240° C. until the reaction mixture became homogeneous. Upon cooling, the product was a dark, tacky fluid.

The results of this experiment in which the unsaturated conjunct polymers were absent from the reaction mixture when compared with the results of the experiment of Example VII utilizing a mixture of the conjunct polymers and soybean oil in the preparation of the factice demonstrates the advantages obtained by incorporation of the highly unsaturated conjunct polymers in the reaction mixture. These contrasting results (the products being respectively a dark, tacky oil as compared to a light-colored solid product possessing rubbery characteristics) are believed to depend upon the greater number of olefinic bonds per molecule present in the reaction mixture containing the unsaturated conjunct polymers, resulting in the formation of higher molecular weight products containing a greater number of carbon-sulfur linkages.

I claim as my invention:

1. A process which comprises reacting sulfur at a temperature of from about 125° to about 275° C. with a conjunct polymer mixture of polyolefinic, cyclic hydrocarbons having an average number of double bonds per molecule of from about 2.5 to about 4, of which from about 40 to about 70% are conjugated.

2. The process of claim 1 further characterized in that said hydrocarbons are reacted with the sulfur in admixture with an unsaturated fatty acid ester drying oil.

3. A process which comprises reacting sulfur at a temperature of from about 125° to about 275° C. with a copolymerized mixture of an unsaturated fatty acid ester drying oil and polyolefinic cyclic hydrocarbons having an average number of double bonds per molecule of from about 2.5 to about 4, of which from about 40 to about 70% are conjugated.

4. The process of claim 3 further characterized in that said drying oil is linseed oil.

5. The process of claim 3 further characterized in that said drying oil is soybean oil.

6. A process which comprises reacting sulfur and a drying oil reactant at a temperature of from about 125° to about 275° C. and in a weight ratio of sulfur to drying oil reactant of from about 0.05 to about 1, said drying oil reactant comprising a substantial proportion of polyolefinic cyclic hydrocarbons having an average number of double bonds per molecule of from about 2.5 to about 4, of which from about 40 to about 70% are conjugated.

7. The process of claim 6 further characterized in that said reactant comprises an unsaturated fatty acid ester drying oil in addition to said hydrocarbons.

8. The process of claim 6 further characterized in that said reactant consists essentially of a copolymerized mixture of said hydrocarbons and an unsaturated fatty acid ester drying oil.

9. The reaction product of sulfur with a conjunct polymer mixture of polyolefinic, cyclic hydrocarbons having an average number of double bonds per molecule of from about 2.5 to about 4, of which from about 40 to about 70% are conjugated.

10. The reaction product of sulfur with a mixture of an unsaturated fatty acid ester drying oil and polyolefinic, cyclic hydrocarbons having an average number of double bonds per molecule of from about 2.5 to about 4, of which from about 40 to about 70% are conjugated.

11. The reaction product of sulfur with a copolymerized mixture of an unsaturated fatty acid ester drying oil and polyolefinic, cyclic hydrocarbons having an average number of double bonds per molecule of from about 2.5 to about 4, of which from about 40 to about 70% are conjugated.

12. The reaction product of sulfur with a drying oil reactant in a weight ratio of sulfur to drying oil reactant of from about 0.05 to about 1, said drying oil reactant comprising a substantial proportion of a conjunct polymer mixture of polyolefinic, cyclic hydrocarbons having an average number of double bonds per molecule of from about 2.5 to about 4, of which from about 40 to about 70% are conjugated.

13. The product of claim 12 further characterized in that said reactant comprises an unsaturated fatty acid ester drying oil in addition to said hydrocarbons.

14. The product of claim 12 further characterized in that said reactant consists essentially of a copolymerized mixture of said hydrocarbons and an unsaturated fatty acid ester drying oil.

15. The product of claim 14 further characterized in that said unsaturated fatty acid ester drying oil is linseed oil.

16. The product of claim 14 further characterized in that said unsaturated fatty acid ester drying oil is soybean oil.

HERMAN S. BLOCH.

References Cited in the file of this patent

UNITED STATES PATENTS

| Number | Name | Date |
|---|---|---|
| 2,181,964 | Chittick | Dec. 5, 1939 |
| 2,309,692 | Chittick | Feb. 2, 1943 |
| 2,312,750 | Cohen | Mar. 2, 1943 |
| 2,316,964 | McKinney et al. | Apr. 20, 1943 |
| 2,390,900 | Loane et al. | Oct. 5, 1943 |
| 2,413,281 | Auer | Dec. 31, 1946 |
| 2,436,457 | Soday | Feb. 24, 1948 |
| 2,509,495 | Hammond | May 30, 1950 |

FOREIGN PATENTS

| Number | Country | Date |
|---|---|---|
| 115,635 | Australia | July 29, 1942 |